July 28, 1964 R. KLEFISCH 3,142,483
ANNEALING BOX COVER
Filed Aug. 16, 1962 3 Sheets-Sheet 1

RUDOLF KLEFISCH
INVENTOR.

BY
Mestern, Ross & Mestern

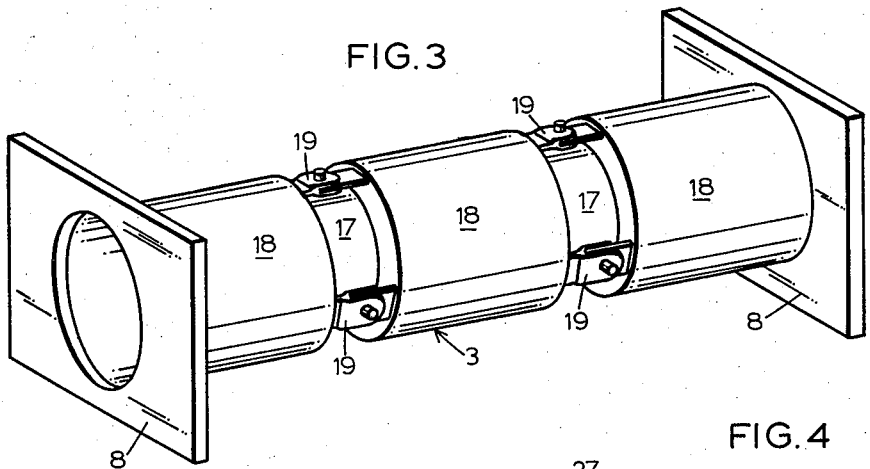
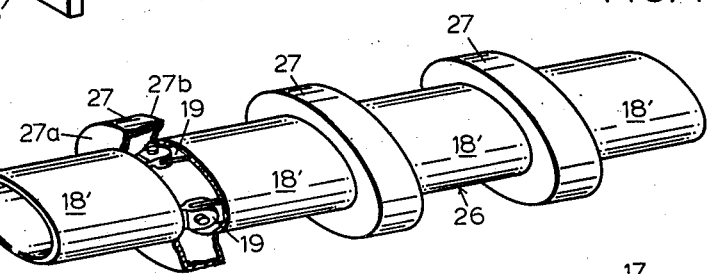
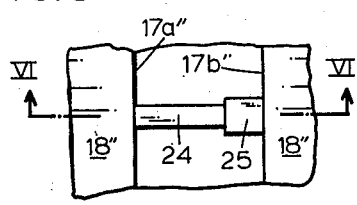
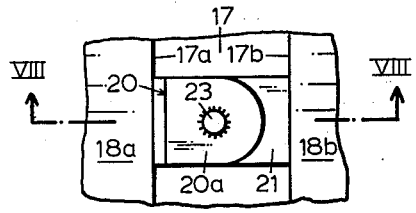
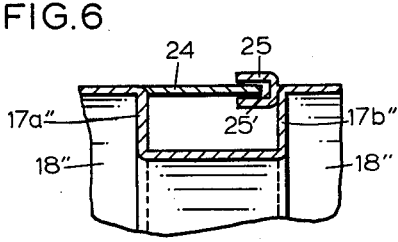
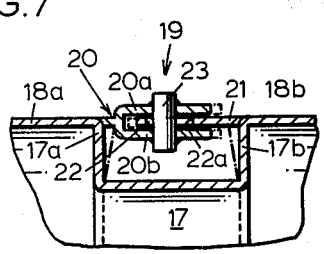
RUDOLF KLEFISCH
INVENTOR.

July 28, 1964     R. KLEFISCH     3,142,483
ANNEALING BOX COVER
Filed Aug. 16, 1962     3 Sheets-Sheet 3
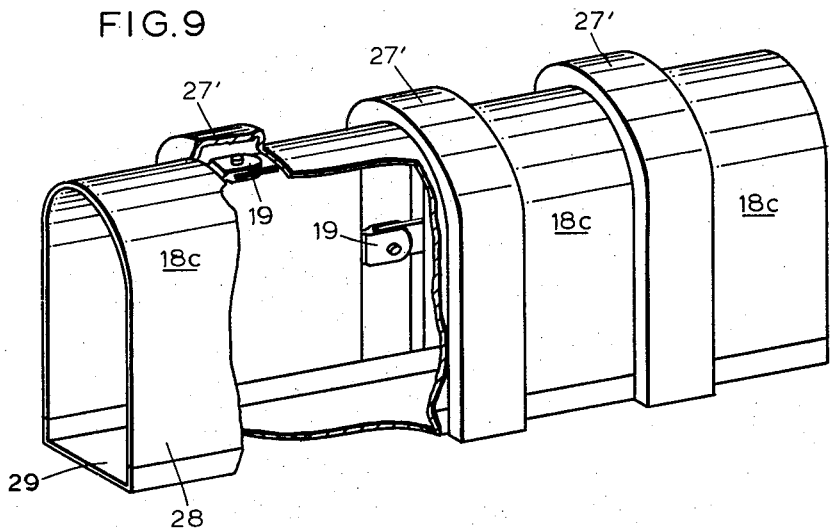
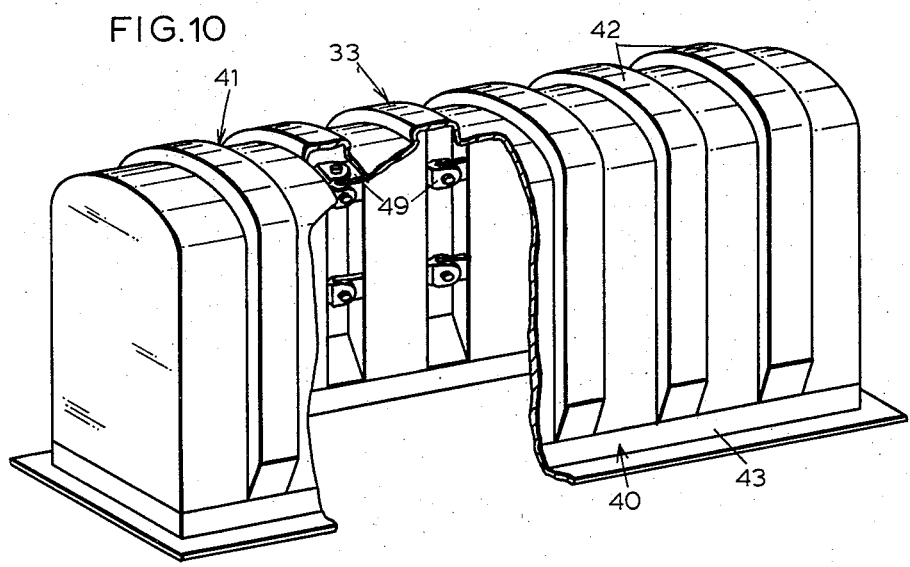
RUDOLF KLEFISCH
INVENTOR.
BY Mestern, Ross & Mestern

United States Patent Office 3,142,483
Patented July 28, 1964

3,142,483
ANNEALING BOX COVER
Rudolf Klefisch, Siebengebirgsallee 165,
Cologne, Germany
Filed Aug. 16, 1962, Ser. No. 217,488
4 Claims. (Cl. 263—49)

My present invention relates to furnaces and other heating devices wherein the material to be heated is at least partly enclosed by a sheet-like heat shield or the like which is interposed between the material and the source of thermal energy.

Generally, such heat shields are known as muffles, mantles or hoods, depending upon their specific application. For example, elongated muffles are employed in muffle furnaces open at least at one end through which the material to be heated is passed. The material may include metallic (e.g. iron and/or steel) bodies to be annealed, other bodies to be heat-treated, and articles composed of agglomerated particles to be sintered into rigid units. These longitudinally extending furnaces may also be employed for elongated bodies which are inserted into the heating chamber at least partly enclosed by the aforementioned muffle and which remain there during the entire heating process. Conveying means may also be employed to move the bodies through the furnace. Hood-type furnaces comprise mantles or shells, at least partly constructed from sheet metal, which are set over the articles to be thermally treated. For the most part, furnaces of the latter type are employed for stacked articles requiring a prolonged heat treatment not satisfactorily carried out in a continuous process with the aid of such conveying means. The heat shield, mantle or muffle is usually surrounded by a heat-retaining housing (e.g. of heat-resistant or refractory material) which also encloses a source of thermal energy, such as one or more electric-heating coils disposed intermediate the housing and the shield.

Heretofore, the heating coils extended generally longitudinally of or transversely to the major dimension of the heating chamber enclosed by the shield which was provided with transverse or annular corrugations adapted to obviate the dislocation and rupture characterizing smooth-surface shells of the character described. These corrugations permitted the ready expansion and contraction of the muffles or shells but had other disadvantages. Thus, whereas smooth-surface mantles suffered from collapse as a consequence of the lower temperature within the heating chamber as compared with the higher temperature outside the latter during the initial stages of heating when the temperature of the articles to be heated was substantially less than that of the thermal source, corrugated muffles or hoods suffered from extension beyond the elastic limit of the relatively thin sheet material so that, upon cooling, the heat shield did not always return to its original state. Since the corrugations comprised confronting wall portions extending transversely to the main direction of elongation of the shield, metal fatigue frequently resulted at the juncture between these wall portions and the walls of the mantle extending in this direction, thereby resulting in contraction of the shield. Other thermal stresses due to non-uniform radiation of heat by the treated materials to the inner walls of the shield as well as to nonuniform temperature distribution within the furnace often produced cracks and other dislocations in the shield. It should be noted at this point that these effects frequently resulted in the extension of one of the corrugations beyond its elastic limit while other corrugations remote from the high-temperature region expanded to a much lesser degree.

Previous attempts to eliminate the shrinkage or contraction of the muffle or hood have led to the provision, along at least one side of the heat shield (e.g. the bottom), of rigid reinforcing members, such as stiffening bars, flat plates or the like, which spanned all of the corrugations and were rigidly secured to the shell, thereby reducing the possibility that the corrugations would deform beyond their elastic limit. These efforts have not met with great success inasmuch as large wall stresses were created, resulting in a permanent deformation of the corrugations and of the entire heat shield.

It is an object of the present invention to provide an improved heat shield of the character described wherein the disadvantages of hitherto known devices are obviated.

It is a more specific object of the present invention to provide a mantle or hood for a muffle or hood furnace permitting shield extension while limiting permanent deformation of the sheet-metal portions of the shield.

These objects are realized, in accordance with the present invention, in a heating unit or annealing box of the aforementioned type with the aid of a heat shield at least partly formed by a sheet-metal shell, which is provided with several longitudinally spaced corrugations extending generally transversely to the major direction of the shell. These corrugations each comprise two confronting wall portions extending transversely to this direction which are spanned by compensating means permitting expansion and contraction of the corrugations within predetermined limits. The compensating means, advantageously, comprises a pair of interfitting members each secured to a respective wall portion for preventing disalignment of these wall portions. Abutment means may also be provided in order to limit the extension of the corrugations to an amount within the elastic limit of the material, thereby obviating the permanent deformation of the corrugations.

The compensating members, which may be spaced along the corrugations, comprise, according to a more specific feature of the invention, a bifurcated member whose arms embrace an element extending in the direction of the bifurcated member from the opposite wall portion of the corrugations. The element may be a generally flat strip forming an extension of the shell while the bifurcated member is formed with a complementary, generally flat slot opening in the direction of the element for receiving same. The flat slot and strip serve to prevent disalignment of the shield sections defined by the corrugations. Thus, if the shield has straight-line generatrices extending over several sections, the compensating members advantageously extend along such generatrices to prevent dislocation of one section relative to the other.

The interfitting members comprising the compensating means may, alternatively, be a pair of telescoping tubes each of which is secured to one of the shield or muffle sections joined by the corresponding corrugation. The abutment means limiting the separation of the opposite wall portions of the corrugation may comprise a pin-and-slot arrangement provided on the two members or a pair of stop surfaces abuttingly engageable in the thermally deformed state of the corrugations. It will be apparent, therefore, that nonuniform heating of the muffle or shield to result in excessive deformation of one of the corrugations will cause the abutting surfaces to mutually engage and limit such deformation when it tends to exceed the elastic limit of the structure. Gradually, the temperature of the shield equalizes so that all of the corrugations or folds are substantially equally deformed, the temperature of the furnace being so selected that, under normal conditions, the elastic limit may be approached but not excessively surpassed.

The above and other objects, features and advantages of the present invention will become more readily apparent from the following description, reference being made to the accompanying drawing in which:

FIG. 3 is a perspective view of a generally cylindrical shield or muffle of the type employed in the furnace of FIG. 1;

FIG. 4 is a perspective view of yet another furnace muffle;

FIG. 5 is a fragmentary plan view showing the interfitting members spanning a corrugation of a muffle or hood according into the invention;

FIG. 6 is a sectional view taken along the line VI—VI of FIG. 5;

FIG. 7 is a view similar to FIG. 5 of the interfitting members of the muffle shown in FIGS. 1 and 3;

FIG. 8 is a cross-sectional view taken along the line VIII—VIII of FIG. 7;

FIG. 9 is a perspective view, with parts broken away, of a heat shield having a bottom plate and provided with compensating means according to the invention;

FIG. 10 is a perspective view, with parts broken away, of a hood-type heat shield suitable for use in the furnace shown in FIG. 2;

Figure 1:
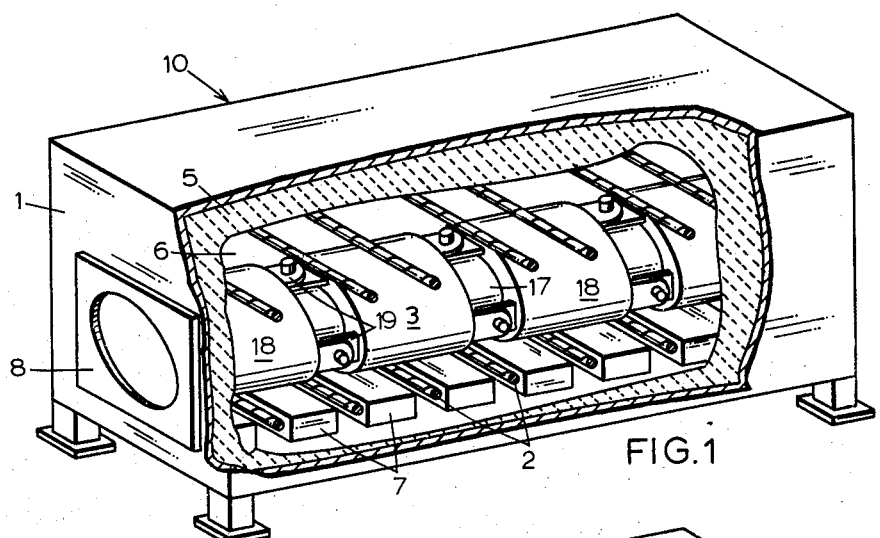
FIG. 1 is a perspective view of a muffle furnace, partly broken away to show an improved muffle according to the invention.

In FIG. 1 I show a muffle furnace or annealing box 10 which comprises a metallic casing 1 lined with heat-resistant refractory material 5 (e.g. fire brick or other ceramic) forming a heating compartment 6. A sheet-metal cylindrical heat shield or muffle 3 is disposed within this compartment 6 and rests upon longitudinally spaced refractory blocks 7 between which pass heating coils 2 surrounding the shield.

At the open ends of the shield, plates 8 are provided which close off the compartment 6 from the atmosphere. The muffle, which is shown in greater detail in FIG. 3, is subdivided by annular corrugations 17, extending transversely to the main direction of thermal elongation of the muffle (i.e. along its axis) into sections 18 whose common generatrices lie in axial direction. Compensating means 19 are spaced along the corrugations and interconnect the sections 18 with freedom of limited relative axial movement upon thermal expansion.

As can be seen from FIGS. 7 and 8, the corrugations 17 comprise a pair of confronting transverse wall portions 17a, 17b integral with the outer walls 18a and 18b of the respective sections 18. These spacedly juxtaposed wall portions, which tend to be deflected inwardly (as shown by dot-dash lines in FIG. 8), are spanned by the compensating means 19. The latter comprise a first, generally flat member 21 which extends from its wall portion 17b in the direction of the opposite wall portion 17a and is embraced between the arms 20a and 20b of a bifurcated member 20 projecting from the wall portion 17a. The arms 20a, 20b form a flattened slot serving to guide member 21 to prevent dislocation of the section 18 in a direction transverse to their common axis. The flattened member 21 receives, in its slot 22, an abutment pin or stud 23 which is welded ot the arms 20a, 20b and bridges the latter while extending generally radially. The resulting pin-and-slot abutment means permits relative mobility of the sections 18 upon heating of the muffle 3 until the elastic limit of the wall portions 17a, 17b at their junctures with walls 18a and 18b is approached, thereby constituting a lost-motion connection which bridges the corrugation 17. Further displacement is retarded by the engagement of the pin 23 with the extremity 22a of slot 22 as the lost-motion connection comes to the end of its stroke. Thus, deformation of the corrugations 17 beyond their elastic limit is prevented until temperature equalization within the furnace lowers the temperature of any overheated portions of the muffle. The pairs of members 20, 21, constituting the spaced compensating means, extend along the common generatrices of the sections 18 on the outer surface thereof since wall portions 17a and 17b extend inwardly in a direction transverse to the axis of the muffle.

In FIG. 4 I show another muffle 26 suitable for use in a furnace of the type illustrated in FIG. 1. The sections 18' of elliptical cross-section, separated by the corrugations 27, are again bridged by pairs 19 of compensating members of the type shown in FIG. 8. In FIG. 4, however, the wall portions 27a and 27b extend outwardly so that the compensating means 19, while lying along generatrices of the sections 18', extend along the inner surfaces of the muffle.

Figure 2:
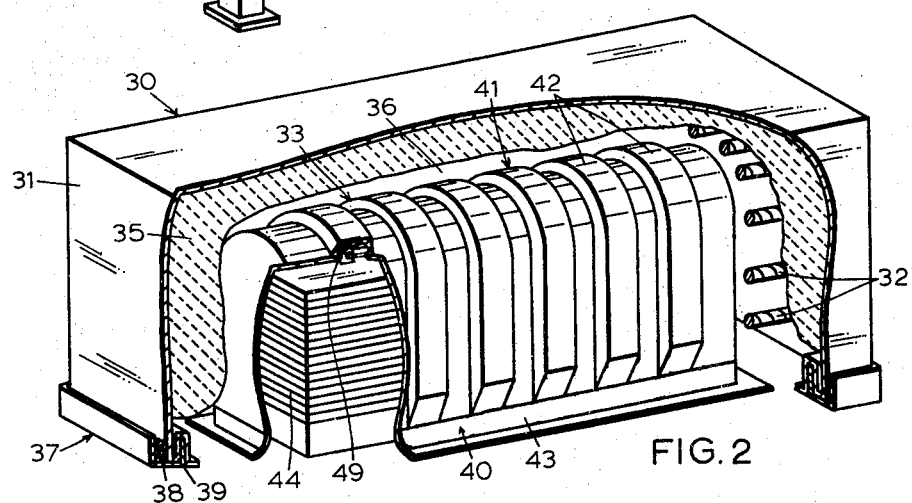
FIG. 2 is a view similar to FIG. 1 of a hood-type furnace for the heat-treatment of stacked material.

FIG. 2 shows a hood-type furnace for the heat treatment or annealing of stacked material. This furnace comprises a metal casing 31 which is lined with refractory brick 35 enclosing the heating compartment 36. Longitudinally extending helical electric-heating coils 32 are disposed in this compartment about the hood 33; this hood is best seen in FIG. 10. The furnace 30 has its upper part removable from its base 37 which is formed with a channel 38. Casing 31 is formed with a downward extension 39 adapted to be received in channel 38 which may be filled with a comminuted heat-resistant material such as sand. The hood 33 also rests upon the base 37 and is formed with a relatively thick-walled lower part 40 and a sheet-metal shell portion 41 constituting the upper part of the hood. This portion is formed with corrugations 42 which terminate at the angle-iron frame 43 of the lower part 40 and are spanned by compensating means 49 of the type already described with reference to FIGS. 4 and 8. The material to be heat-treated (e.g. plates 44) is stacked on the base 40 whereupon the hood 33 is disposed thereover and the upper part of the furnace is put in place. Heating then proceeds as in conventional devices with the compensating means 49 preventing deformation of the corrugations 42 beyond the elastic limit.

Another compensating arrangement is shown in FIGS. 5 and 6 wherein the sections 18 of a muffle or other heat shield 18" have their wall portions 17a" and 17b" spanned by a flat member 24 which is received in a bifurcated member 25, the members being secured to their respective wall portions. In this case, the floor of the bifurcation 25' forms an abutment for the member 24, limiting relative displacement of the sections 18' in the manner previously described.

FIG. 9 shows a muffle which comprises a relatively thick-walled cast metallic lower part 29 which is rigid with the upper sheet metal shell 28 of the muffle. The sections 18c of the latter are spanned by the compensating means 19, as previously described, at the corrugations 27'.

Figure 11:
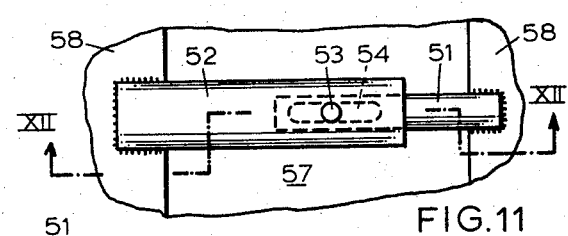
FIG. 11 is a plan view illustrating a detail of yet another compensating means.
Figure 12:
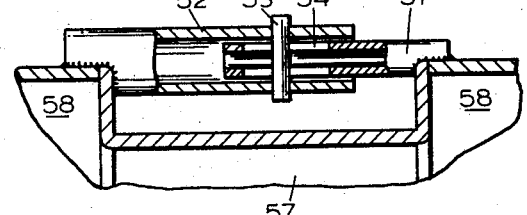
FIG. 12 is a cross-sectional view taken along the line XII—XII of FIG. 11.

In FIGS. 11 and 12 I show another compensating means wherein the interfitting members consist of telescopable tubes 51 and 52 which are rigid with their respective muffle sections 58 and connect the latter at the corrugations 57. The outer tube 58 is provided with a radially extending stud 53 which passes through a slot 54 in the inner tube 58. The stud 53 and slot 54 oppose displacement of the sections 58 beyond the elastic limit of the corrugation 57 as previously described.

The invention described and illustrated is believed to admit of many modifications within the ability of persons skilled in the art, all such modifications being deemed included within the spirit and scope of the invention as claimed.

I claim:

1. An annealing box for use in heat treating, comprising a heat shield for at least partly enclosing material to be treated and to be exposed to a source of thermal energy, said shield comprising an elongated shell of sheet metal adapted to expand thermally in the longitudinal direction, said shell being formed with a plurality of longitudinally spaced corrugations extending generally transversely to said direction and subdividing said shell into a plurality of longitudinally spaced sections interconnected by said corrugations, and compensating means including a plurality of lost-motion connection means each respectively bridging a single corrugation for limiting the relative longitudinal mobility of adjoining sections to an extent preventing deformation of the respective corrugation beyond its elastic limit.

2. An annealing box as defined in claim 1 wherein each of said corrugations is bounded by a pair of confronting wall portions extending generally transversely to said longitudinal direction, each of said lost-motion connection means including a pair of connecting members respectively secured to said confronting wall portions.

3. An annealing box as defined in claim 2 wherein one of said members partly embraces the other, thereby bracing the adjoining shell sections against relative transverse displacement.

4. An annealing box as defined in claim 2 wherein said members are substantially in line with the periphery of said shell.

References Cited in the file of this patent
UNITED STATES PATENTS

| | | |
|---|---|---|
| 1,832,933 | Hunter | Nov. 24, 1931 |
| 2,063,603 | Hunter et al. | Dec. 8, 1936 |
| 2,529,609 | Jacob | Nov. 14, 1950 |
| 2,661,963 | Brown et al. | Dec. 8, 1953 |
| 3,008,700 | Klefisch | Nov. 14, 1961 |
| 3,044,805 | McDonald | July 17, 1962 |
| 3,066,960 | Adams | Dec. 4, 1962 |